2,806,791
STABILIZATION OF FOAMS

Alexander Frieden, Whitefish Bay, and Harold H. Geller, Milwaukee, Wis., assignors to Premier Malt Products, Inc., Milwaukee, Wis., a corporation of Delaware No Drawing. Application October 7, 1952, Serial No. 313,584

9 Claims. (Cl. 99—48)

This invention relates to the stabilization of foams by the use of hydrolytic products from cereal grains or parts of cereal grains, such as wheat gluten or spent brewers' grains. More particularly, it relates to the stabilization of foams in carbonated, alcoholic, protein-containing beverages.

Malted barley contains about 10% proteins. These may exist as pure proteins or as complexes, in combination with tannins, carbohydrates, or other such materials. During the process of brewing, about one-third of the barley protein complexes is solubilized by enzyme action and brought into solution. The remainder of the proteins is left as a residue and is filtered or settled out along with the balance of the unused grains. This product is known as spent grains. It is the proteins of this brewing by-product which are preferred as the source of material for the hydrolysis herein described.

It is known that soluble protein complexes are in part responsible for beer flavor, beer character and head retention, but are also responsible for beer instability. Thus, only certain protein complexes are desirable in beer.

We have discovered a method by which many of these insoluble protein complexes may be properly degraded and separated from undesirable proteins, producing soluble fractions which on addition to a malt beverage, greatly enhances the foam stability and character of that beverage without affecting its clarity or stability.

Consequently, one of the objects of this invention is to provide a new and improved method for stabilizing the foams of fermented malt beverages.

Another object of this invention is to produce fermented malt beverages possessing a greatly improved head retention capacity as well as a fuller flavor.

A further object of this invention is to provide a new and improved method of stabilizing foams in carbon dioxide-containing beverages in which proteins and protein complexes are present in dispersed or dissolved form.

A more specific object of the invention is to provide a new and improved method of stabilizing beer foam.

Another object of the invention is to provide a new and improved beer characterized by its improved foam-head retention capacity. Other objects will appear hereinafter.

In accordance with the invention, we have discovered that the foam-head retention capacity of a fermented malt beverage, such as beer, may be greatly increased by the addition of small amounts of hydrolyzed protein complexes obtained from cereal grains, portions of cereal grains or spent grains. Spent grains are the water-insoluble portion of the grains which remain from the brewing process. Since spent grains are a by-product of the brewing operation and are readily available, it is preferred to work with this material. However, the invention applies to other similar materials.

A typical analysis of a spent grain is as follows:

| Ingredients: | Percent by weight |
|---|---|
| Protein | 24 |
| Fat | 5 |
| Fiber | 18 |
| Non-protein, non-fat, non-fiber such as hemicelluloses and moisture | Remainder |

As the starch is completely converted to sugars during mashing, the spent grains are substantially free from starch components.

In general, the hydrolysates are prepared by mixing the wet spent grains or similar material in water and heating at various temperatures in the presence of varying concentrations of acids and alkalis. As the composition of spent grains may vary from time to time, and as other materials such as wheat protein, trub, etc., may be used in the hydrolysis, it is necessary to vary the conditions of hydrolysis accordingly. One skilled in the art may readily determine the necessary conditions of hydrolysis and treatment of the hydrolysate as illustrated below.

Proteolytic enzymes may also be used for this purpose. However, when using enzymes, it is preferred to first degrade the spent grains with acids or alkalis.

The active foam producing material in the protein hydrolysates employed for the purpose of the invention are soluble in water. While some of the foaming materials are hydrolyzed proteins, it is possible that another portion of the foaming fraction may be composed of melanoidins. In the presence of acids and alkalis the hemicellulose and protein portions of spent grains may be hydrolyzed to lower carbohydrates and amino acids, respectively. It is known that in the presence of acids, and especially alkalis, these materials may unite to produce melanoidins which may be responsible for some of the foaming properties of the hydrolysates.

In order to measure the increase in foam stability produced by the protein hydrolysate, the sigma method was used. This method is described in the Proceedings of the American Society of Brewing Chemists for 1940. It consists of producing a foam in a foam-forming liquid such as beer by passing a stream of carbon dioxide through a porous cylinder and then measuring the liquid volumes in the collapsed and uncollapsed foam after a given period of time. The sigma value is calculated by the formula given in the article referred to above.

The following examples illustrate the use of these protein hydrolysates as foam stabilizers in malt beverages and are not intended to limit the scope of this invention.

Example I

Eighty (80) grams of spent grain (400 g. wet grains) were mixed with 2 liters of .1 N sodium hydroxide and heated to 180° F. After five hours of hydrolysis the mixture was cooled and the pH adjusted to 4.3 with a mineral acid. A heavy precipitate was formed on adjusting the pH to 4.3. This precipitate contained protein complexes which produced considerable turbidities in beer. The pH 4.3 mixture was then mixed with filter aid and filtered sharply giving a clear brown filtrate which contained 0.4% protein. When this protein material was added to beer in a concentration of 0.02% of solids, based on the weight of the beer, the latter remained clear and the sigma value was increased from 120 to 137.

Example II

Forty (40) grams of spent grains (200 g. wet grain) were mixed with 1 liter of .05 N alkali and heated to 200° F. for 45 minutes. The mixture was cooled, adjusted to pH 4.3, and filtered sharply with filter aid, giving a clear brown filtrate which contained 1% protein. When this hydrolyzed protein was added to beer in a concentration of 0.1% of solids based on the weight of the beer, the latter remained clear and the sigma value was increased from 115 to 149.

Example III

Forty (40) grams of spent grain (200 g. wet) were mixed with 1 liter of .1 N $H_2SO_4$ and heated under reflux for 3 hours. The mixture was adjusted to pH 4.3 with caustic and filtered sharply with filter aid. The clear yellow solution obtained contained .4% protein. When this hydrolyzed protein was added to beer in a concentration of 0.027%, the beer remained clear and the sigma value was increased from 115 to 137.

*Example IV*

Eighty (80) grams of spent grain were mixed with 2 liters of .25 N sodium hydroxide and heated under reflux for 1 hour. The mixture was adjusted to pH 4.3 after cooling and filtered. The clear filtrate contained 0.7% protein. When this protein was added to beer in a concentration of 0.036% solids based on the weight of the beer, the sigma value was increased from 120 to 149.

*Example V*

One hundred-sixty (160) grams of spent grain were mixed with 4 liters of .1 N sodium hydroxide and heated at 200° F. for four hours. The mixture was cooled and the pH adjusted to pH 4.8. Filter aid was added to the mixture which was then sharply filtered. The clear brown filtrate contained 0.59% protein. When this protein was added to beer in a concentration of 0.03% of solids based on the weight of beer, the sigma value was increased from 120 to 184.

*Example VI*

Twenty (20) grams of wheat gluten (protein material obtained from wheat flour) were mixed with 1 liter of .1 N $H_2SO_4$ for 5 minutes in a Waring blender. The mixture was then heated under reflux for a half hour. After cooling the mixture was adjusted to pH 4.5 and filtered with filter aid. The clear filtrate contained 0.47% protein. When this hydrolyzed protein was added to beer in concentration of 0.023% solids based on the weight of beer, the latter remained clear and the sigma value was increased from 115 to 138.

*Example VII*

Fifteen (15) grams of "trub" obtained from the hot wort settling tank were mixed with 500 ml. of .1 N $H_2SO_4$ and heated under reflux for 1 hour. The mixture was filtered clear giving a light brown solution which contained 0.145% protein. The acid hydrolysate was adjusted to pH 4.8 and a precipitate formed. After filtration, the clear brown solution contained 0.13% protein. When this hydrolyzed protein was added to beer in a concentration of 0.013% solids based on the weight of the beer the sigma value was increased from 121 to 134.

*Example VIII*

Three (3) grams of wheat gluten were mixed with 100 cc. of .05 N acetic acid in a Waring blender for 10 minutes. The mixture was brought to pH 5.0 with NaOH. If this mixture was filtered and added directly to beer, a very slight turbidity was produced. In this case, however, 4 mg. of ficin was added to the mixture. After 24 hours at 70° F. the mixture was filtered sharply with filter aid. The filtrate contained 0.1% protein. When this hydrolyzed protein was added to beer in a concentration of 0.005% of solids based on the weight of the beer, the sigma value was increased by 19 units, and a clear beer resulted.

In accordance with processes similar to those described in the examples other protein hydrolysates can be prepared from similar water-insoluble non-starchy, protein-containing materials.

As indicated by the examples, in order to obtain the desired foam stabilizing material which is effective for the intended purpose without producing turbidity in the beer, it is desirable to remove turbidity-producing protein complexes. This can be accomplished by adjusting the pH of the hydrolysate to the acid side, preferably with a mineral acid and preferably to pH of around 4.3. The turbidity forming complexes become insoluble under these conditions and can be removed by filtration, usually with a filter aid.

In some cases a portion of the desired foaming protein may be adsorbed by the precipitate formed by lowering the pH to 4.3. In such cases the pH of the solution is lowered to pH 5.0 and treated with protein precipitating agents that will remove the turbidity producing protein materials. Any excess of the precipitating agent is removed and the solution filtered clear with filter aid. The resulting solution will increase the sigma value of beer without producing a turbidity. One skilled in the art may readily determine the amount of precipitating agent required for a given hydrolysate.

As illustrated by Example VIII, proteolytic enzymes can also be used to produce the foaming proteins as well as to remove the turbidity-forming protein complexes. The pH at which the maximum amount of these complexes is removed can readily be determined by routine experiment and will depend upon the particular proteolytic enzyme used.

The quantity of the protein hydrolysate which is required for the purpose of the invention is very small. In most instances an amount within the range of 0.005 to 0.1% weight of the active foam producing material based on the total weight of the foam forming liquid will be satisfactory to enhance the foam stability.

The protein hydrolysate may be added to the foam-forming liquid at a suitable time in the process of manufacture. In the production of beer it is preferably added after the first filtration and before the final filtration. Excellent results have been obtained by incorporating the protein hydrolysate with the beer at least twenty-four hours prior to the final filtration of the beer. The invention is applicable generally to the stabilization of foams in carbonated, alcoholic, protein-containing beverages and particularly those beverages which are substantially clear liquids, for example, beer, ale, and porter.

As indicated by the examples, the invention is not limited to a particular protein cereal as a starting material for the manufacture of a water-soluble protein hydrolysate. The cereal protein material may be derived from any of the cereal grains such as, for example, wheat, rye, oats and barley.

The invention has the advantage that by the addition of a fraction of a percent of the water-soluble protein hydrolysates, both satisfactory improved foam stability and good chill-haze stability of beer and other similar fermented malt beverages are obtained. A further advantage of the invention is that the foam stabilizing agents are derived from readily available raw materials.

The invention is hereby claimed as follows:

1. A method of stabilizing the foam of a foam-forming fermented malt beverage which comprises adding to the fermented beverage about 0.005% to 0.1% by weight on a solids basis of a water-soluble protein hydrolysate produced by hydrolyzing a recovered by-product of beer manufacture selected from the group consisting of spent grain and trub, with a member selected from the group consisting of acids, alkalis, and proteolytic enzymes, providing a pH of about 4 to 5 in the resulting hydrolysis mixture, and removing proteins at said pH which when said hydrolysis mixture is added to said fermented beverage produce turbidity therein.

2. A method of stabilizing the foam of beer while providing a good chill-haze stability which comprises adding to beer after the first and before the last filtration about 0.005% to 0.1% by weight on a solids basis of a water-soluble protein hydrolysate produced by hydrolyzing a recovered by-product of beer manufacture selected from the group consisting of spent grain and trub, with a member selected from the group consisting of acids, alaklis, and proteolytic enzymes, providing a pH of about 4 to 5 in the resulting hydrolysis mixture, and removing proteins at said pH which when said hydrolysis mixture is added to beer produce turbidity therein.

3. A method of stabilizing the foam of beer while providing a good chill-haze stability which comprises adding to beer after the first and before the last filtration about 0.005% to 0.1% by weight on a solids basis of a water-soluble protein hydrolysate produced by hydrolyzing a recovered by-product of beer manufacture selected from the group consisting of spent grain and trub, with a member selected from the group consisting of acids, alkalis, and proteolytic enzymes, providing a pH of about 4 to 5 in the resulting hydrolysis mixture and thereby precipitating proteins which when said hydrolysis mixture is added to beer produce turbidity therein, and removing the precipitate.

4. A method of stabilizing the foam of beer while providing a good chill-haze stability which comprises adding to beer after the first and before the last filtration about 0.005% to 0.1% by weight on a solids basis of a water-soluble protein hydrolysate produced by hydrolyzing spent grain recovered from beer manufacture, with a member selected from the group consisting of acids, alkalis, and proteolytic enzymes, providing a pH of about 4 to 5 in the resulting hydrolysis mixture, and removing proteins at said pH which when said hydrolysis mixture is added to beer produce turbidity therein.

5. A method of stabilizing the foam of beer while providing a good chill-haze stability which comprises adding to beer after the first and before the last filtration about 0.005% to 0.1% by weight on a solids basis of a water-soluble protein hydrolysate produced by hydrolyzing spent grain recovered from beer manufacture by heating the spent grain with an alkali, providing a pH of about 4 to 5 in the resulting hydrolysis mixture and thereby precipitating proteins which when said hydrolysis mixture is added to beer produce turbidity therein, and removing the precipitate.

6. A method of stabilizing the foam of beer while providing a good chill-haze stability which comprises adding to beer after the first and before the last filtration about 0.005% to 0.1% by weight on a solids basis of a water-soluble protein hydrolysate produced by heating a recovered by-product of beer manufacture selected from the group consisting of spent grain and trub with an alkali for about ¾ hour to 5 hours, providing a pH of about 4 to 5 in the resulting hydrolysis mixture, and removing proteins at said pH which when said hydrolysis mixture is added to beer produce turbidity therein.

7. A method of stabilizing the foam of beer while providing a good chill-haze stability which comprises adding to beer after the first and before the last filtration about 0.005% to 0.1% by weight on a solids basis of a water-soluble protein hydrolysate produced by heating a recovered by-product of beer manufacture selected from the group consisting of spent grain and trub with an acid for about 1 hour to 3 hours, providing a pH of about 4 to 5 in the resulting hydrolysis mixture, and removing proteins at said pH which when said hydrolysis mixture is added to beer produce turbidity therein.

8. A method of stabilizing the foam of beer while providing a good chill-haze stability which comprises adding to beer after the first and before the last filtration about 0.005% to 0.1% by weight on a solids basis of a water-soluble protein hydrolysate produced by heating a recovered by-product of beer manufacture selected from the group consisting of spent grain and trub with an alkali for about ¾ hour to 5 hours and at a temperature of about 180° F. to reflux temperature, providing a pH of about 4 to 5 in the resulting hydrolysis mixture and thereby precipitating proteins which when said hydrolysis mixture is added to beer produce turbidity therein, and removing the precipitate.

9. A method of stabilizing the foam of beer while providing a good chill-haze stability which comprises adding to beer after the first and before the last filtration about 0.005% to 0.1% by weight on a solids basis of a water-soluble protein hydrolysate produced by heating spent grain recovered from beer manufacture with about 0.05N to 0.25N NaOH for about ¾ hour to 5 hours and at a temperature of about 180° F. to reflux temperature, providing a pH of about 4.3 to 4.8 in the resulting hydrolysis mixture and thereby precipitating proteins which when said hydrolysis mixture is added to beer produce turbidity therein, and removing the precipitate.

References Cited in the file of this patent

UNITED STATES PATENTS

| | | |
|---|---|---|
| 90,827 | Eisendrath | June 1, 1869 |
| 223,038 | Gaunt | Dec. 30, 1879 |
| 264,941 | Frings | Sept. 26, 1882 |
| 713,646 | Kaserer | Nov. 18, 1902 |
| 1,509,467 | Boidin | Sept. 23, 1924 |
| 2,259,582 | Perky | Oct. 21, 1941 |

OTHER REFERENCES

Wahl, R.: American Brewers Review, vol. X, pages 462–464.

Wahl-Henius: American Handy Book of the Brewing, Malting and Auxiliary Trades, vol. 2, 1908, pages 1043–1051.

Schmidt: Chemistry of the Amino Acids and Proteins, 1938, Chas. Thomas, Baltimore, Md., pages 132, 133.